United States Patent [19]

Kraus

[11] Patent Number: 4,531,414
[45] Date of Patent: Jul. 30, 1985

[54] LINEAR DISPLACEMENT TRANSDUCER DEVICE

[76] Inventor: Robert A. Kraus, 1636-T E. Edinger Ave., Santa Ana, Calif. 92705

[21] Appl. No.: 612,335

[22] Filed: May 21, 1984

[51] Int. Cl.³ .......................... G01D 5/34; G01L 7/06
[52] U.S. Cl. .................... 73/705; 73/517 R; 73/653; 73/717; 250/231 P
[58] Field of Search .............. 73/705, 717, 653, 655, 73/516 R, 517 R; 250/231 P, 231 R

[56] References Cited

U.S. PATENT DOCUMENTS

| | | | |
|---|---|---|---|
| 3,159,750 | 12/1964 | Kazan | 250/231 P |
| 3,590,261 | 6/1971 | Snook | 250/231 P |
| 3,730,633 | 5/1973 | Kennedy | 250/224 |
| 3,742,233 | 6/1973 | Gergems | 250/231 P |
| 3,768,311 | 10/1973 | Gorgens | 73/705 |
| 3,788,795 | 12/1973 | Zeitlin | 250/231 P |
| 3,789,674 | 2/1974 | Anderson et al. | 73/517 R |
| 3,961,185 | 6/1976 | Brokenshire et al. | 73/517 R |
| 4,109,147 | 9/1978 | Heske | 250/231 P |
| 4,122,337 | 10/1978 | Okuda | 250/231 P |
| 4,239,963 | 12/1980 | August et al. | 73/517 R |

Primary Examiner—Donald O. Woodiel

[57] ABSTRACT

A transducer device for translating increments of linear displacement by means of opto-electronic sensing into increments of units expressed into units of volts. The device comprises an opto-electronic system, having a pair of co-planar, adjacently disposed radiation sensitive surfaces of square configuration, and a thereto facing, closely spaced surface of rectangular configuration being designed to emit a uniform pattern of radiation over its entire active surface. Wherein, the geometry of the emissive and sensing surfaces during relative movement provide a ratio of produced volt equivalent to the ratio of relative displacement between the emissive and sensing surfaces.

5 Claims, 8 Drawing Figures

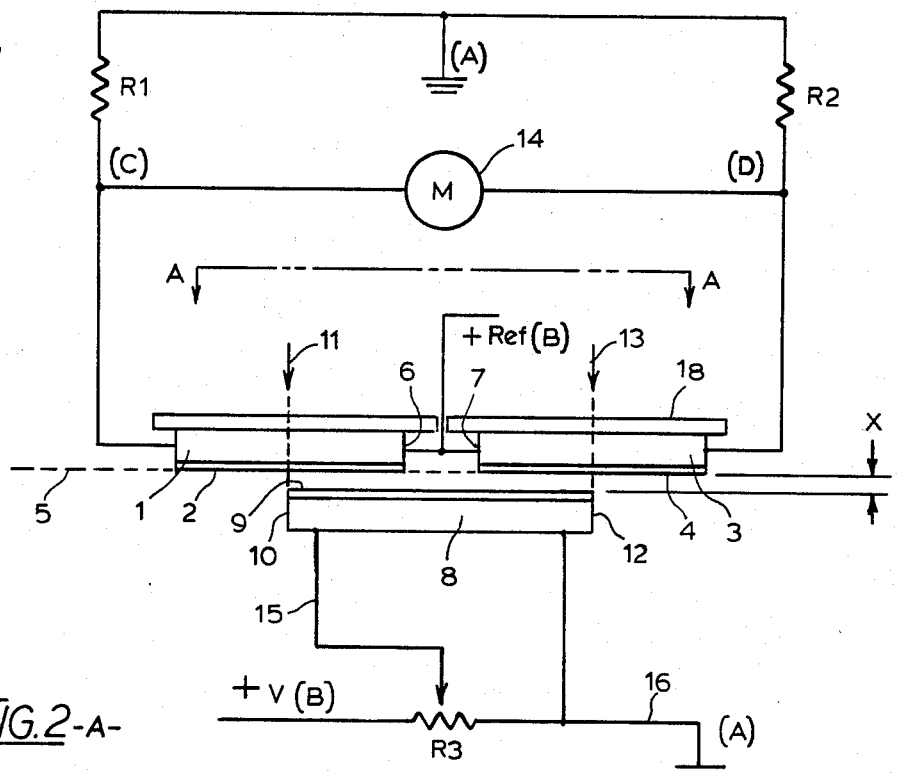
*FIG.1*
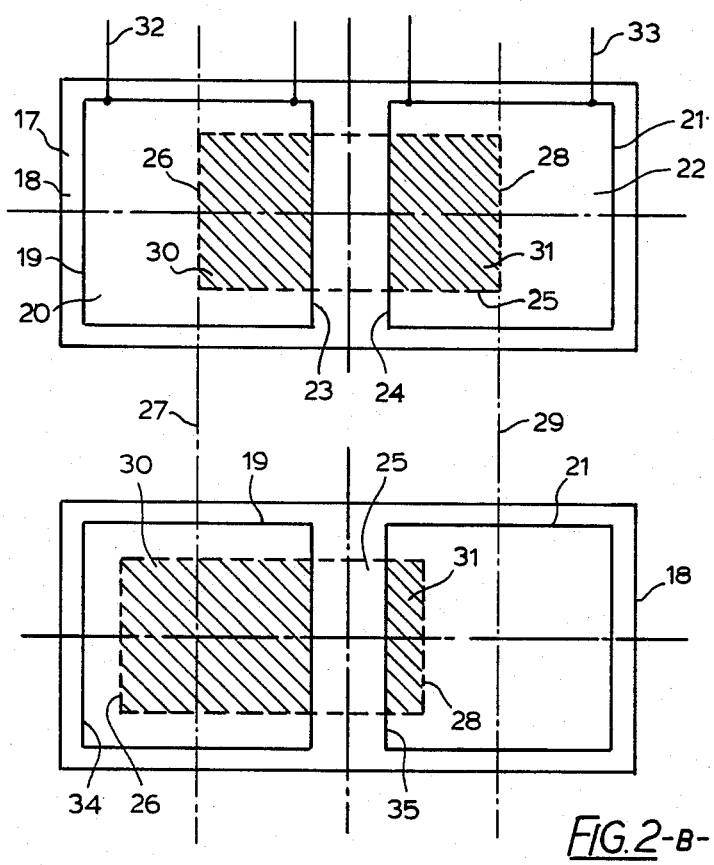
*FIG.2-A-*
*FIG.2-B-*
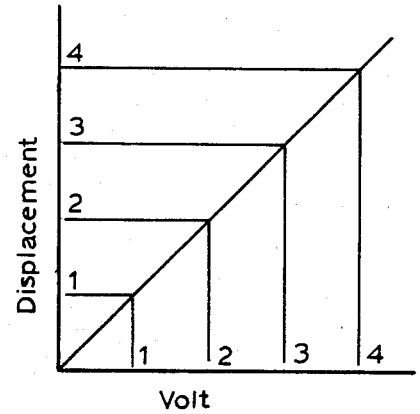
*FIG.3*

LINEAR DISPLACEMENT TRANSDUCER DEVICE

The present invention relates to linear displacement measuring devices. More specifically, it relates to transducer devices for translating increments of linear displacement, acceleration or force by means of opto-electronic sensing into proportional increments of units expressed in Volts.

Transducer devices for measuring a linear displacement, force and pressure are known to exist in a variety of configurations, and are so marketed.

A major throwback of the devices of the prior art is their intrinsic non linear electric output. I.e., the magnitude per increment of electric output expressed volts, is not proportional to the magnitude per increment of linear displacement, or force to be measured.

It is therefore common practice to employ costly electronic signal conditioning circuitry to compensate for the device's intrinsic limitations, which makes it virtually impractical to utilize such transducer devices for most commercial applications. The new and novel cost reducing concept of the present invention however makes it possible to use opto-electronic transducer devices, even, in the automotive and appliance field.

Basically, the opto-electronic emitter and detector system as a part of the transducer devices of the prior art known to us, utilize a light emitting point source such as a LED as an emitter, and a light beam blocking vane between the emitter and an opposite thereto located light sensing phototransistors or photodiode as a receiver. Such light emitting diodes and phototransistors have mainly been developed for use in on-of switching, edges control as well as for position stop and other applications where the lateral scanning of a beam of light, for the measuring of a linear displacement is not involved.

Extensive development work on my part showed the impracticality of the lateral scanning of a light beam between a point source and a small area reseiver for the purpose of measuring a linear displacement. In fact, one of our earlier patent application with the title "Opto-electronic Force Sensing Device" having the Ser. No. 06/239,069, and having been filed on Feb. 27, 1981, specifically dealing with the linearization of such devices is now abandoned, since the problem of linerization could not be solved at that time. For a point source, such as e.g., a light emitting diode or a small incandescent lamps, the total flux being radiated, is the integral of the flux, incident within a hemisphere, wherein the pattern describes the ratio of radiant intensity at an of axis angle, to the axial radiant intensity. For this reason, the pattern of radiation from a point source to a planar receiver surface is not of trough lambertian character, i.e., the radiant intensity being received by the planar surface of the opto-electronic senser is not evenly distributed over the entire area to be irradiated. The scanning of the square, or a rectangular, planar surface of a photodiode, or phototransistor being irradiated by a point source, therefore, does not produce a ratio of electric output equivalent to the ratio of linear displacement by the scanning device.

In contrast to the devices of the prior art, the device of the present invention utilizes as part of its basic opto-electronic emitter and detector system, a relative large area, planar faced, light emitting source of rectangular configuration, which, is distinguishable from other light emitting devices, by its unique property, of emitting a through lambertian radiation pattern. Such as e.g., the self-luminescent, light emitting source known by the trade name "Isolite" being manufactured by the Safety Light Corporation, or the "Electro-Luminescent Lamp" being manufactured by Luminescent System, Inc. Certain light bars, having either a linear incandescent filement, or a closely spaced linear array of LEDs in conjunction with a highly light diffusing planar surface element, work equally well. In any case, it is important, that the radiative pattern is of through lambertian characteristic, i.e., the light emitting pattern is uniformly distributed over the entire active area of the light emitting surface. As a further part of the basic opto-electronic emitter and detector system the device of the present invention utilizes a pair of identical, relative large area, coplanar faced photodiodes of square of rectangular configuration. Such as e.g., the Silicon planar Pin Photodiode BPW-34, the Photodiode SFH-100, or the single, homogeneous Differential Photodiode Pair of the type BPX 48 being marketed by Litronix.

In the present invention, the photodiodes are part of a wheatstone bridge network consisting of the two photodiodes, and two resistors of equal resistance value being connected in a diamond array. In the arrangement, a current source is connected to two opposite junctions, and a voltmeter is connected between the other two junctions, thus completing the sensor network.

It is therefore an object of the present invention to provide the means for generating an linear, electric output signal from an opto-electronic force transducer device without the need for extensive optical, and or electronic compensating means.

A further object of the present invention is to provide the means for generating a linear, electric output signal from an opto-electronic device for the measuring of a linear displacement without the need for extensive optical, and or electronic compensation means.

A still further object of the present invention is to provide the means for measuring the magnitude of a force, and to produce a thereto proportional electric output signal without the need for extensive electronic circuitry.

Yet a still further object of the present invention is to provide the means for measuring the magnitude of an change in velocity, and to produce a thereto proportional electric output signal without the need for extensive electronic circuitry.

The features which are belived to be characteristic of the present invention, both as to their organization and method of operation, together with further objects and advantages will be better understood from the following description in combination with the accompanying drawing which we have chosen for purpose of explaining the basic concept of the invention, it is to be clearly understood however, that the invention is capable of being implemented into other forms and embodiments within the scope and spirit of the defining claims by those skilled in the art, which will be taken advantage of.

In the drawing:

FIG. 1 represents the schematic illustration of the opto-electronic emitter and detector system as part of a wheatstone bridge network incorporated in the device of the present invention.

FIG. 2 -A- is the top view A-A of of the co-planar arrangement of the pair of light sensing photodiodes in FIG. 1 being disposed on a common substrait, in which the thereon superimposed light emitting source is shown at zero position.

FIG. 2 -B- is the same arrangement, wherein the thereon superimposed light emitting source is shown as being shifted to full span position.

FIG. 3 represents a graphic illustration of linear displacement, versus volts.

Figure 4:
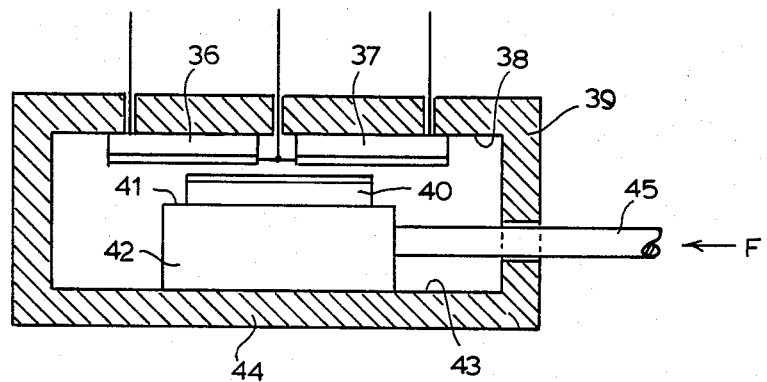
FIG. 4 is a schematic side view of an embodiment of the invention, in which a mechanical force provides motive power for the relative movement between the emitter and detector pair.
Figure 5:
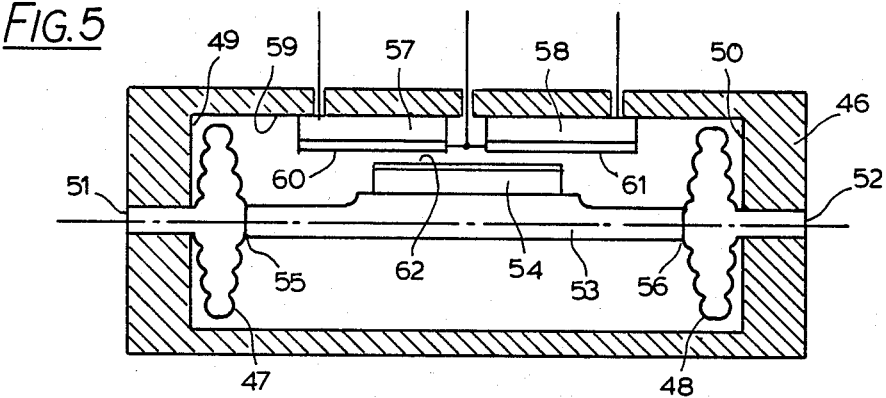
FIG. 5 is a schematic side view of an embodiment of the invention, in which a differential pressure provides motive power for the relative movement between the emitter and detector pair.
Figure 6:
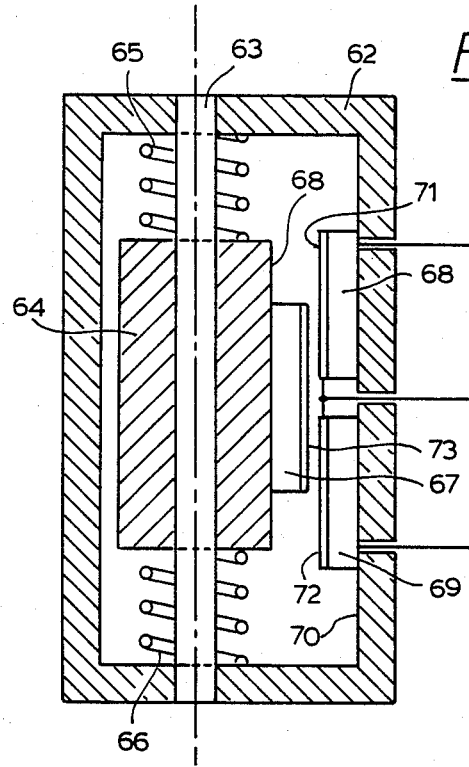
FIG. 6 is a schematic side view of an embodyment of the invention, in which the reluctance of a mass to change velocity provides motive power for the relative movement between the emitter and detector pair.

Refering now to drawing FIG. 1, showing the composite arrangement of the opto-electronic emitter and detector system which is part of the linear displacement measuring device in FIGS. 4, 5 and 6. The arrangement as seen in FIGS. 1 and 2, describe the relative movement, and the change in the geometry between the planar surfaces of the light emitting element and the stationary photodiode pair, which constitutes the essence of the invention.

The opto-electronic emitter and detector system relevant to this invention comprises the first photodiode 1 having the dimensionally well defined planar, light sensitive area 2 of square configuration, and the thereto identical second photodiode 3 having the light sensitive area 4. Light sensitive areas 2 and 4 of photodiodes 1 and 3 are disposed at a co-planar relationship with dotted line 5, and are disposed, so as to align with ends 6 and 7 adjacent to one another. The arrangement further comprises the movable, electro luminescent source of light 8 having the dimensionally well defined planar light emitting surface 9 of rectangular configuration. The light emitting surface 9 of light source 8 is disposed, so as to parallelly face light sensitive surfaces 2 and 4 of photodiodes 1 and 3, having the smallest possible distance (x) between them. When the opto-electronic emitter and detector system is mechanically at center position, and 10 of light source 8 is positioned at the center of photodiode 1 (arrow 11), while end 12 is positioned at the center of photodiode 3 (arrow 13). Photodiodes 1 and 3, and resistors R1 and R2 are connected to form a wheatstone bridge network, in which a current source is connected between the opposite junctions (A) and (B), and a voltmeter 14 is connected between the junctions (C) and (D). In the arrangement, an electrical potential between junctions (C) and (D) produces a corresponding read-out on the meter. Since R1 and R2 are of equal resistive value, if the voltages and current produced by photodiodes 1 and 3 are equal, the electrical potential between junctions (C) and (D) will be the same. Hence, no current may flow through meter 14, Therefore, the meter reading will be zero. The shifting of the light emitting surface 9 between zero and full span position either up or down, will produce a corresponding difference in the voltage between photodiodes 1 and 3. For span adjustment, the luminous intensity of light emitting surface 9 is varied by the amount of current being admitted to light source element 8 having the leads 15 and 16. Leads 15 and 16 of light source element 8, are connected via the veriable resistor R3 to current source (A) and (B), wherein, the veriable resistor R3 is utilized to regulate the amount of admitted current to light source element 8. Whereby, regardless of the luminous intensity of light source surface 9, the bridge network will be at balance, as long as the opto-electronic emitter and detector system is mechanically at center position.

The relevant geometry of the opto-electronic emitter and detector system also may be seen in FIG. 2 -A- and -B-. In FIG. 2 -A-, the stationary assembly 17 comprises the substraight 18 forming the base for the thereto affixed photodiode 19 having the radiation sensitive surface 20 of square configuration, and the thereto identical photodiode 21 having the radiation sensitive surface 22. At both arrangements, ends 23 and 24 of radiation sensitive surfaces 20 and 22 are disposed parallel, and adjacent to one another. The movable light emitting surface 25 of rectangular configuration is shown in dotted lines superimposed onto the assembly, so that end 26 is positioned at the center 27 of photodiode 19, while end 28 is positioned at the center 29 of photodiode 21.

When the light emitting source 25 is at zero position, the actively illuminated, portions 30 and 31 (shaded areas) on photodiodes 19 and 21 are of equal size. Hence, the photo-electronic emitter and detector system is at ballance. I.e., both photodiodes, when illuminated by the same source, produce the same amount of electric output at their terminal leads 32 and 33 respectively. Which in turn renders the bridge at balance, therefore the meter will read zero. FIG. 2 -B- shows the composite arrangement of the stationary substrait 18 and thereto affixed photodiodes 19 and 21, in which the light emitting surface 25 is shifted to full span position, where, end 26 of light emitting surface 25 is located at close proximity to end 34 of photodiode 19, and end 28 of emitting surface 25 is located at close proximity to end 35 of photodiode 21.

During the shifting of light emitting surface 25, the ratio of linear addition to the illuminated area 30 on photodiode 19, versus the ratio of linear deduction from illuminated area 31 on photodiode 21 is the same. Thus, during shifting of the light emitting source, the ratio of linear displacement versus the ratio of consequential difference in the actively illuminated areas on both photodiodes are the same. Therefore both photodiodes produce at bridge junctions (C) and (D) a difference in the voltage, equivalent to the ratio of linear displacement by the light emitting source, as may be seen in the displacement, versus voltage diagram in FIG. 3.

To implement the motive power to achieve relative movement between the opto-electronic components the Drawing Figs. give three examples of how it may be accomplished.

FIG. 4 represents the basic means by which to implement the relative movement between the source of light and the stationary photodiode pair described in FIGS. 1 and 2. In the arrangement, photodiodes 36 and 37 are stationary disposed on surfaces 38 of frame portion 39, while the light emitting source 40 is fixedly disposed on surface 43 of frame portion 44. A force F applied to push rod 45 provides relative movement between the light emitting source and the photodiode pair.

FIG. 5 is an alternate embodiment of the present invention, in which the relative movement between the source of light and the stationary photodiode pair is implemented, by the arrangement comprising the housing element 46. The flexible capsules 47 and 48, each being hermetically disposed at inner ends 49 and 50 of the housing element. Ports 51 and 52, each provide fluid communicative connection between the capsules inner side and an external pressure source. The movable connecting member 53 bearing the light mitting element 54 is fixedly disposed between ends 55 and 56 of the slightly preloaded capsules 47 and 48 having equal spring rate, which keeps the light emitting assembly centered between them. The photodiodes 57 and 58 are stationary disposed at the inside 59 of the housing element, so that their light sensing surfaces 60 and 61 face surface 62 of light emitting element 54 at a co-planar relationship, while having the smallest possible distance between them. As capsule 48 is pressurized, it will expand, thereby compressing via connecting member 53 the opposite thereto located capsule 47. Wherein, during movement, the ratio of consequent displacement of the load is equal to the ratio of the consequential diverence in pressure within the capsules elements.

FIG. 6 is an alternate embodiment of the present invention, comprising the housing element 62 and the there within longitudinally disposed shaft 63. The shaft is provided with a thereon frictionless sliding mass 64, which is kept at its intrinsic center position by the two substantially preloaded, and opposite thereon acting springs 65 and 66 having equal spring rate.

The light emitting source 67 is fixed to the side 68 of mass 64, so as to be movable therewith. Photodiodes 68 and 69 are stationary fixed to the inside 70 of housing 62, so that their light sensitive surface 71 and 72 will align at a co-planar relationship with the light emitting surface 73 of light source 67, having the closest possible distance between them.

In the arrangement, the motive power for the relative movement between the light emitting source 67 and photodiodes 68 and 69 is provided by the reluctance of mass 64 to change its longitudinal velocity at a rate, equal to the rate of change in velocity experienced by the housing element when an external force is applied thereto. Wherein, the ratio in the change in velocity of mass 64 is equal to the ratio of applied force.

Figure 7:
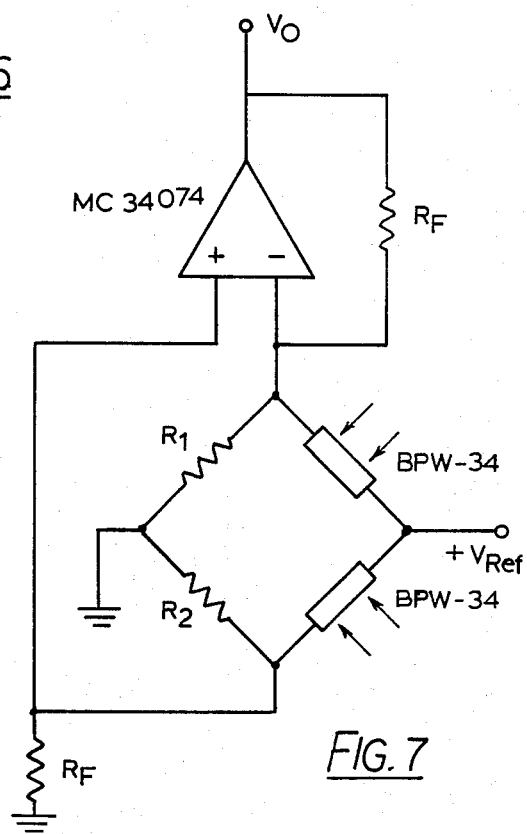
FIG. 7 represents a wheatstone bridge arrangement, including a current amplifier.

FIG. 7 represents an the schematic arrangement of the devices incorporated wheatstone bridge arrangement incorporating a current amplifier means.

What is claimed is:

1. A transducer device for translating increments of linear displacement by means of opto-electronic sensing into proportional increments of units expressed in volts;
    said device comprises in combination housing means
        having first and second interdependent components, said first interdependent component comprises first and second radiation sensing element each having first and second electrical connection, and each having a planar, radiation sensitive surface defined by four corners of right angular configuration, said first and said second radiation sensitive surface being disposed in tandem, at a co-planar relationship adjacent to one another;
    a second interdependent component, comprising first and second electrical connection, and a planar, radiation emissive surface defined by four corners of right angular configuration, said surface having an uniformly over its active area distributed radiation pattern;
        said radiation emissive surface being disposed opposite to, and facing said first and said second radiation sensitive surface at a closely spaced, parallel relationship;
    means for providing relative movement between said first and second interdependent components, being disposed within said housing means so as to move intrinsically to a position, where said radiation emissive surface faces opposite to at least one half of said first and opposite to at least one half of said second radiation sensing surfaces, and being disposed so that it may be influenced by external means to change position through stations of infinite resolution relative to said first and said second radiation sensitive surfaces, wherein at maximum change in position, a major portion of said radiation emissive surface faces a major portion of said first radiation sensitive surface, and a minor portion of said radiation emissive surface faces the minor portion of said second radiation sensing surface.

2. A device as in claim 1, comprising a first and a second circuit network;
    said first circuit network comprises two opposite pair of junctions including said first and said second radiation sensitive element, and a first and second resistor means of equal resistive value being disposed in a diamond array, wherein a current source is connected between one junction pair and a load is connected to the other junction pair;
    said second circuit network comprises said radiation emissive element and control means for changing the radiant intensity thereof, wherein said circuit network is connected to said current source.

3. a device as in claim 1, wherein said means for providing relative movement between said interdependent components bears one of said components, and is slidable disposed within said housing means, thereby allowing its displacement by the application of a mechanically thereto transmitted, external force;
    and wherein, the other radiation interdependent component is stationary disposed within said housing menans.

4. A device as in claim 1, wherein said measn for providing relative movement between said interdependent components bears one of said components, and is fixedly disposed to and between the inner ends of two oppositely thereto located, flexible members;
    said flexible members being hermetically fixed with their outer ends to within said housing means, being provided with ports for admitting pressure from an external source to permit pressurizing of at least one of said flexible members;
    and wherein, said other interdependent component is stationary disposed within said housing means.

5. a device as in claim 1, wherein said means for providing relative movement between said interdependent components is a mass of material bearing one of said components, said mass is disposed to move frictionless within, the relative to said housing means, being driven by a consequential force arising from the reluctance of said mass of material to change velocity at a rate equal to the rate of change in velocity said housing will experiences, if an external force is applied thereto;
    and wherein said outer interdependent component is stationary disposed within said housing.

* * * * *